May 23, 1961  W. R. KEMPF ET AL  2,985,703
PRIMARY CELL
Filed Jan. 28, 1958

INVENTORS
WALTER R. KEMPF
HAROLD S. MORGAN
BY
ATTORNEY 2,985,703
Patented May 23, 1961

2,985,703

PRIMARY CELL

Walter R. Kempf, Lancaster, and Harold S. Morgan, Columbia, Pa., assignors to Hamilton Watch Company, Lancaster, Pa., a corporation of Pennsylvania Filed Jan. 28, 1958, Ser. No. 711,675

6 Claims. (Cl. 136—166)

This invention relates to electric current producing cells and more particularly relates to the anode and cap construction of a primary dry cell.

Dry cells having a zinc anode, a cathode of a depolarizer material including an electrolytically reducible oxygen yielding compound and an electrolyte are generally encased in two-part metal containers of upper and lower portions. The cases are sealed together after the inclusion of the anode, the cathode and the electrolyte and the battery is then ready for use.

In the manufacture of disc type primary dry cells of the general nature of those illustrated in the assignee's copending applications Serial Nos. 615,409 and 635,256, now Patent numbers 2,862,987 and 2,937,222, filed October 11, 1956 and January 22, 1957, respectively, some difficulty is encountered in establishing and maintaining a good electrical contact between the anode and the cell cap or casing in which the anode is mounted. These difficulties are discussed in detail in application Serial No. 615,409 and it will be apparent that if the electrical connection between the cell cap and the anode is destroyed, the useful life of the cell is terminated.

Cells of the type disclosed in the aforementioned copending applications find a particularly advantageous use in electric watches, for instance, watches of the type disclosed in assignee's copending application, Serial No. 409,934, filed February 12, 1954, now Patent number 2,888,797. Cells used for this purpose are extremely small, being of the approximate size of a shirt button, and present numerous manufacturing difficulties which are not encountered in handling conventional sized cells such as, for instance, the type cells shown in United States Patent No. 2,254,710.

It is accordingly a primary object of the present invention to provide an improved primary dry cell wherein the anode is mechanically locked to the anode cap or casing and a method for making the same.

It is another object of the invention to provide an improved primary dry cell wherein the anode matingly engages the anode cap or casing.

It is another object of the invention to provide an improved type of primary dry cell wherein an anode of flowable material is formed within the anode cap or casing so as to matingly engage the casing and interlock therewith to form a mechanical connection between the anode and casing.

Figure 1:
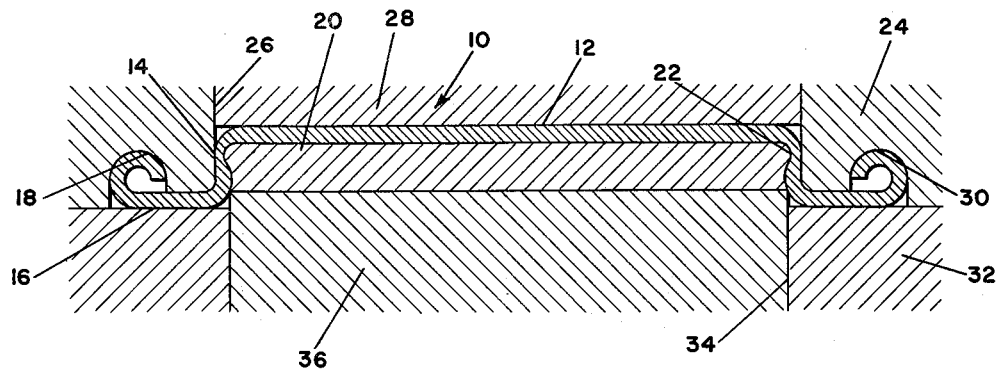
Figure 2:
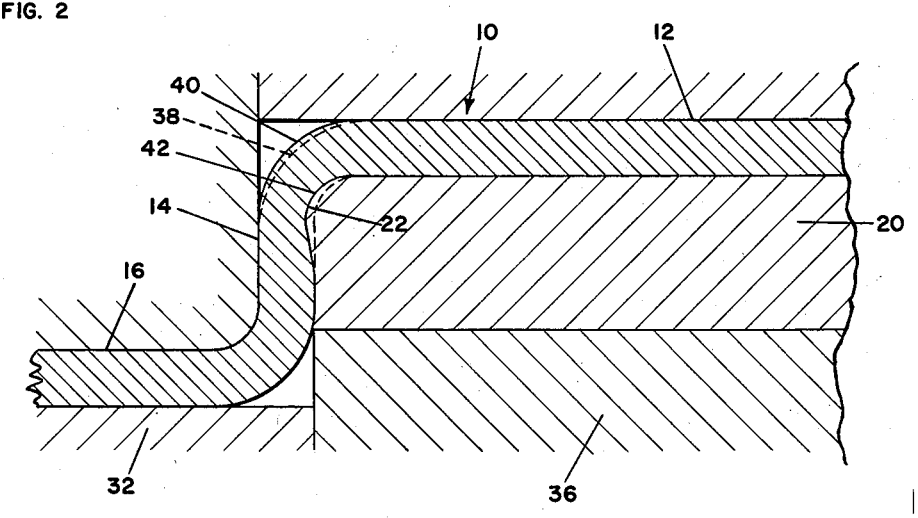

These and further objects and advantages of the invention will become more apparent upon reference to the following specification and claims and appended drawings wherein:

Figure 1 is a vertical cross-section showing an anode cap constructed according to the present invention in the forming tool; and Figure 2 is an enlarged vertical cross-section of the assemblage of Figure 1 showing the interlocking action between the anode and anode cap or casing.

Referring more particularly to the drawings, there is shown the anode and anode cap of a disc type alkaline primary cell of the same general type as is disclosed in assignee's copending application, Serial No. 615,409 and 635,256. Alkaline cells of this general type are well described in the numerous United States patents issued to Samuel Rueben of which Patent No. 2,422,045 is illustrative. Generally speaking, they consist of an anode of pelletized zinc powder amalgamated with mercury, a pelletized cathode of mercuric oxide and fine graphite, and an electrolyte of concentrated potassium hydroxide substantially saturated with zinc oxide. The cell is assembled in a steel can plated with gold, nickel or other metal to provide corrosion protection and this can is closed by means of a top which may consist of Gilder's metal (90% copper, 10% zinc), or steel plated with tin, cadmium or zinc.

Referring to Figure 1, there is shown an anode cap in the form of a dished disc having a top 12 and peripheral cylindrical side wall 14. An annular flange 16 extends outward from the end of the peripheral wall 14 and terminates in a rolled-over rim 18, the purpose of which is described in detail in assignee's copending application Serial No. 697,616, filed Nov. 20, 1957. Where the cell is the miniature type designed for use in an electric watch, the anode cap may be formed from steel sheet approximately .008 inch thick having thereon a tin coating .001 inch thick.

Mounted in the anode cap is an anode 20 consisting of powdered zinc which is pelletized by the application of a compressive force as is well known in the art. According to the invention the peripheral wall 14 of the anode cap has on its inner surface an annular groove 22 and the anode 20 is compressed so that it completely fills this groove to mechanically lock the anode in the anode cap.

Figure 1 shows the anode cap mounted in a tool suitable for accomplishing this locking action and consisting of a metal die 24 having a bore 26 therein within which a backing member 28 is mounted. The die 24 is provided with an annular groove 30 to receive the rolled over rim 18 and mates with a second die 32 having a bore 34. A plunger 36 is received in the bore 34 and is movable into the wall 14 of the anode cap to compress the anode 20 against the support provided by the member 28 and the bore 26 within the die 24. The anode 20 may be provided simply in the form of a powder or may be pre-pelletized prior to mechanically interlocking it with the anode cap.

Referring to Figure 2, there is shown the preferred method of forming the groove 22 in the anode cap and of mechanically interlocking the anode 20 therein. Referring to this figure, the anode is initially drawn so that its wall thickness at the bend 38, shown by the broken line, is less than the wall thickness of the cap in the top 12 and peripheral wall 14. That is to say, the broken lines in Figure 2 illustrate the shape of the anode cap prior to the time that the anode 20 is compressed therein.

When the anode cap is manufactured with this shape, the application of pressure to the powdered zinc anode 20 by means of the plunger 36 forces the outer surface of the bend 38 to the position shown in the solid line 40. This simultaneously forces the inner surface of the metal forming the bend to the position shown at 42, thereby forming the groove 22. It will be seen that the anode itself forms the groove 22 and is in intimate mechanical contact therewith throughout the forming operation and afterwards.

This action provides not only a good electrical contact between the anode 20 and the anode cap 10, but also a mechanical interlock therebetween which retains the good electrical contact during the use of the cell and also forms an anode-anode cap sub-assembly which facilitates assembly of the complete cell.

While the invention has been discussed in terms of a powdered zinc anode, it will be apparent to those skilled in the art that any flowable anode is susceptible to use in the formation of the anode-anode cap assembly of this invention and the invention is intended to comprehend such various anode materials.

It will be apparent from the foregoing that when an anode is assembled to an anode cap according to the method of this invention to form a sub-assembly of the type disclosed, the anode is firmly mechanically locked to the anode cap to form a good electrical contact therebetween in such a manner that the contact is maintained even after the cell has been in use a considerable period of time. The formation of this sub-assembly in such a simple manner makes easier the subsequent handling and construction of the cell and thereby materially reduces cell cost.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A primary dry cell anode assembly comprising a dished metal anode cap having a top and a peripheral wall extending therefrom, said peripheral wall having an annular groove on the inside thereof substantially at the juncture of said top and peripheral wall, and a compacted metal anode mounted in said cap and extending into said groove and being in mating engagement with the peripheral wall forming said groove.

2. A primary dry cell anode assembly comprising a dished metal anode cap having a top and a peripheral wall extending therefrom, said peripheral wall having an annular groove on the inside thereof substantially at the juncture of said top and peripheral wall, and a compacted powdered metal anode mounted in said cap and extending into and filling said groove and being in mating engagement with the peripheral wall forming said groove.

3. A primary dry cell electrode assembly comprising a cup-shaped electrode cap having a top wall and a circumferential wall extending laterally therefrom; an interiorly located annular groove at the juncture of said walls, the wall thickness at said juncture being less than the wall thickness of the remaining portion of said walls; and a compacted metal electrode mounted in said cap and extending into and filling said groove and being in mating engagement with said circumferential wall whereby said electrode will be mechanically locked to the electrode cap.

4. The primary dry cell electrode assembly defined in claim 3 wherein said electrode is an anode.

5. A primary dry cell electrode assembly comprising a cup-shaped electrode cap having a top wall and a peripheral wall extending laterally therefrom, said peripheral wall having an interiorly located annular groove substantially at the juncture of said top and peripheral walls; and a compacted metal electrode mounted in said cap and extending into and filling said groove and being in mating engagement with said peripheral wall.

6. The primary dry cell electrode assembly recited in claim 5 wherein said cap is metal.

References Cited in the file of this patent

UNITED STATES PATENTS

| | | |
|---|---|---|
| 793,307 | Lachman | June 27, 1905 |
| 1,733,866 | Crossley | Oct. 29, 1929 |
| 2,499,239 | Williams | Feb. 28, 1950 |
| 2,575,337 | Ellis | Nov. 20, 1951 |
| 2,582,973 | Ellis | Jan. 22, 1952 |
| 2,606,942 | Bonin | Aug. 12, 1952 |
| 2,697,737 | Goldberg et al. | Dec. 21, 1954 |
| 2,752,693 | Wullschleger | July 3, 1956 |
| 2,781,414 | Ensign et al. | Feb. 12, 1957 |
| 2,837,593 | Rueger | June 3, 1958 |

FOREIGN PATENTS

| | | |
|---|---|---|
| 617,756 | Great Britain | Feb. 10, 1949 |